US008861495B2

(12) United States Patent
Kim et al.

(10) Patent No.: US 8,861,495 B2
(45) Date of Patent: Oct. 14, 2014

(54) METHOD FOR PROTECTING DATA IN A MU-MIMO BASED WIRELESS COMMUNICATION SYSTEM

(75) Inventors: Yun-Joo Kim, Suwon (KR); Jae-Seung Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 177 days.

(21) Appl. No.: 13/511,363

(22) PCT Filed: Nov. 24, 2010

(86) PCT No.: PCT/KR2010/008361
§ 371 (c)(1),
(2), (4) Date: May 22, 2012

(87) PCT Pub. No.: WO2011/065749
PCT Pub. Date: Jun. 3, 2011

(65) Prior Publication Data
US 2012/0236840 A1    Sep. 20, 2012

(30) Foreign Application Priority Data

Nov. 24, 2009  (KR) .................. 10-2009-0113869
Mar. 18, 2010  (KR) .................. 10-2010-0024389

(51) Int. Cl.
*H04W 72/14*    (2009.01)
*H04B 7/04*     (2006.01)
*H04W 74/08*    (2009.01)

(52) U.S. Cl.
CPC ......... *H04B 7/0452* (2013.01); *H04W 74/0816* (2013.01)
USPC ........... 370/338; 370/329; 370/348; 375/267; 375/260; 455/63.4; 455/450

(58) Field of Classification Search
USPC ......... 370/235, 328–329, 338, 348, 310–311; 455/63.4, 273, 450, 434; 375/260, 267
See application file for complete search history.

(56) References Cited

U.S. PATENT DOCUMENTS 6,529,882 B1   3/2003  Park et al.
7,352,718 B1   4/2008  Perahia et al.
(Continued)

FOREIGN PATENT DOCUMENTS

JP   2003-134139 A   5/2003
JP   2005-229448 A   8/2005
(Continued)

OTHER PUBLICATIONS

Office Action and List of References for U.S. Appl. No. 13/479,165 mailed Mar. 6, 2013 from the United States Patent and Trademark Office.

(Continued)

*Primary Examiner* — Charles C Jiang
*Assistant Examiner* — Mohamed Kamara

(57) ABSTRACT

The present invention relates to a method for protecting MU-MIMO (Multi User-Multiple Input Multiple Output) data through a multi-RTS/CTS frame exchange in a MU-MIMO based wireless communication system. The method of the present invention comprises: a process where an indicator for VHT data protection is added to an RTS frame, using the structure of an RTS/CTS frame for an existing legacy terminal during the multi RTS/CTS frame exchange; a process where an access point designates and then transmits the duration period of the RTS frame while transmitting the RTS frame; and a process where wireless terminals up to the (n–1)th terminal designate the duration period of the CTS frame as '0' and send the designated duration period, while only the n-th wireless terminal designates NAV for data protection.

11 Claims, 4 Drawing Sheets

(56) References Cited

U.S. PATENT DOCUMENTS

| | | |
|---|---|---|
| 7,701,920 B2 * | 4/2010 | Takano .................. 370/348 |
| 2005/0141420 A1 | 6/2005 | Li et al. |
| 2005/0147023 A1 | 7/2005 | Stephens et al. |
| 2005/0233776 A1 | 10/2005 | Allen et al. |
| 2006/0078001 A1 | 4/2006 | Chandra et al. |
| 2006/0252443 A1 | 11/2006 | Sammour et al. |
| 2007/0127478 A1 | 6/2007 | Jokela et al. |
| 2007/0147284 A1 | 6/2007 | Sammour et al. |
| 2007/0153830 A1 * | 7/2007 | Xhafa et al. .................. 370/470 |
| 2007/0263528 A1 | 11/2007 | Mukherjee |
| 2008/0002636 A1 | 1/2008 | Gaur et al. |
| 2008/0062178 A1 | 3/2008 | Khandekar et al. |
| 2008/0181161 A1 | 7/2008 | Gi Kim et al. |
| 2009/0040990 A1 * | 2/2009 | Xhafa et al. .................. 370/338 |
| 2009/0059792 A1 * | 3/2009 | Itoh .................. 370/235 |
| 2009/0141726 A1 | 6/2009 | Fang et al. |
| 2009/0154418 A1 | 6/2009 | Kang et al. |
| 2009/0296619 A1 | 12/2009 | Sammour et al. |
| 2010/0067409 A1 * | 3/2010 | Takano .................. 370/277 |
| 2011/0103280 A1 | 5/2011 | Liu et al. |
| 2012/0120931 A1 | 5/2012 | Abraham et al. |
| 2012/0163483 A1 | 6/2012 | Stacey et al. |
| 2012/0230242 A1 | 9/2012 | Kim et al. |
| 2013/0157578 A1 * | 6/2013 | Nanda et al. .................. 455/63.4 |

FOREIGN PATENT DOCUMENTS

| | | |
|---|---|---|
| JP | 2007-214856 A | 8/2007 |
| JP | 2007-286922 A | 11/2007 |
| JP | 2008-517518 A | 5/2008 |
| JP | 2008-278455 A | 11/2008 |
| JP | 2008-539665 A | 11/2008 |
| JP | 2009-528745 A | 8/2009 |
| KR | 1020010045237 A | 6/2001 |
| KR | 1020020079793 A | 10/2002 |
| KR | 1020050059304 A | 6/2005 |
| KR | 10-2006-0045799 A | 5/2006 |
| KR | 1020060081329 A | 7/2006 |
| KR | 1020090012199 A | 2/2009 |
| KR | 1020100050633 A | 5/2010 |
| WO | WO 2006/043773 A2 | 4/2006 |
| WO | WO 2006/115999 A2 | 11/2006 |
| WO | WO 2007/099436 A2 | 9/2007 |
| WO | WO 2008/080279 A1 | 7/2008 |
| WO | WO 2009/114379 A1 | 9/2009 |
| WO | WO 2011/056790 A1 | 5/2011 |
| WO | WO 2011/057009 A2 | 5/2011 |

OTHER PUBLICATIONS

James Gross et al., "Dynamic Multi-user OFDM for 802.11 systems", Jul. 15, 2007, IEEE.

Chi-Hsiang Yeh, "Media Access Control for Real-time Communications in Consumer Electronics Networks", 2009 International Conference on New Trends in Information and Service Science, Jul. 2, 2009, pp. 715-718, IEEE Computer Society.

Mohamed Kamoun, "Efficient backward compatible allocation mechanism for multi-user CSMA/CA schemes", 2009 First International Conference on Communications and Networking, Nov. 6, 2009, pp. 1-6, IEEE.

International Search Report for PCT/KR2010/008361 filed on Nov. 24, 2010.

Office Action and List of References for U.S. Appl. No. 13/478,069 mailed May 30, 2013 from the United States Patent and Trademark Office.

Office Action and List of References for U.S. Appl. No. 13/478,069 mailed Feb. 5, 2013.

Xiaoli Wang et al., "Supporting MAC Layer Multicast in IEEE 802.11n: Issues and Solutions", 2009, IEEE.

Office Action and List of References for U.S. Appl. No. 13/479,165 mailed Oct. 2, 2012 from the United States Patent and Trademark Office.

Hrishikesh Gossain et al., "Supporting MAC Layer Multicast in IEEE 802.11 based MANETs: Issues and Solutions", IEEE Computer Society, 2004.

European Search Report for Application No. EP 10 83 3555 of Oct. 10, 2012.

International Search Report for PCT/KR2010/008351 filed on Nov. 24, 2010.

International Search Report for PCT/KR2010/008355 filed on Nov. 24, 2010.

* cited by examiner

METHOD FOR PROTECTING DATA IN A MU-MIMO BASED WIRELESS COMMUNICATION SYSTEM

TECHNICAL FIELD

Exemplary embodiments of the present invention relate to a method for protecting data by exchanging a RTS (Request To Send) frame and a CTS (Clear To Send) frame in a wireless communication system; and, more particularly, to a method for protecting MU-MIMO (Multi-User Multiple Input Multiple Output) data by exchanging multiple RTS/CTS frames in a wireless communication system based on MU-MIMO.

BACKGROUND ART

A WLAN basically supports a BSS (Basic Service Set) consisting of an AP (Access Point), which serves as the point of access of a DS (Distributed System), and a plurality of wireless STAs (STAtions) other than the AP.

The MAC (Medium Access Control) protocol of the WLAN operates based on CSMA/CA (Carrier Sense Multiple Access/Collision Avoidance). Therefore, the WLAN involves resource wasting in the course of channel contention. In order to alleviate this problem, IEEE 802.11 Workgroup 'e' has defined an enhanced MAC protocol, which proposes that, when a radio resource transmission right is acquired, multiple MPDUs are transmitted using SIFS (Short Inter-Frame Space) during a TXOP (Transmission Opportunity), and block ACKs are received in response thereto (i.e. burst transmission).

Furthermore, IEEE 802.11 Workgroup 'n' has defined an A-MSDU (Aggregated MSDU) and an A-MPDU (Aggregated MDPU). At least one MSDU (which is a transmission unit) or at least one MPDU is aggregated even without IFS, and is transmitted in the process of one-time radio resource contention.

Recent surge in the number of WLAN users is followed by standardization regarding VHT (Very High Throughput) WLAN systems by IEE 802.11 Workgroup 'ac' as an attempt to increase data throughput provided by each BSS.

A VHT WLAN system supports, in a multiple (three)-STA environment consisting of one AP and two STAs, maximum throughput of 1 Gbps at the MAC SAP of the AP, as well as maximum throughput of 500 Mbps at the MAC SAP of a wireless STA for point-to-point environments. There is also consideration made so that each AP and STA of the VHT WLAN simultaneously supports compatibility with existing WLAN (IEEE 802.11a/n system).

When a wireless STA acquires a TXOP in a wireless communication system (e.g. WLAN), the STA needs to receive a response through a response frame regarding a request frame in order to improve reliability of wireless communication. Examples include a CTS frame responding to a RTS frame and an ACK frame responding to a transmitted data frame.

The responses are classified into immediate responses and delayed responses. Responses (ACK frames) to a single piece of data correspond to the immediate responses; and block responses responding to a continuous transmission or aggregated MPDU correspond to both immediate and delayed responses.

An immediate response is used in the following manner: when PHY-RXEND.primitive of a received request frame is generated, a response frame is transmitted after SIFS so that other wireless STAs do not transmit. In this case, the frame exchange sequence constitutes a pair, as described above. The generated response frame may not include a transmission address.

On the other hand, a delayed response is used in the following manner: a response is made through an ACK frame as a basic response for informing of whether an initially generated request frame has been received or not, and a response frame including requested information is then transmitted. The response frame in this case may be transmitted through EDCA (Enhanced Distributed Channel Access) regarding channels, piggybacked by another frame, or aggregated and transmitted together with another frame. According to the delayed response scheme, a transmitting STA receives a response frame from a receiving STA and then informs the receiving STA that the response frame has been received using an ACK frame.

The frame exchange sequence in such a WLAN may be applied to a multiple-user wireless communication system. When uplink MU-MIMO technology is supported, wireless STAs can receive frames according to the above-mentioned frame exchange sequence and simultaneously transmit response frames after IFS.

When uplink MU-MIMO technology is not supported, or when better throughput is desired even if uplink MU-MIMO technology is supported, a wireless STA, after receiving a frame, needs to transmit a response frame using a difference of channel or time.

Schemes for exchanging frames using a difference of time but the same bandwidth in a WLAN system include a scheme of exchanging a request frame eliciting response frames and a response frame through channel access for each wireless STA, and a scheme of transmitting, by a plurality of wireless STAs, successive response frames through a single request frame.

To be specific, the scheme of exchanging a request frame eliciting response frames and a response frame through channel access for each wireless STA is as follows: an AP transmits a request frame to a first wireless STA through channel access; the first wireless STA transmit a response frame after SIFS; the AP transmits another request frame to a second wireless STA through channel access; and the second wireless STA transmits a response frame after SIFS.

The scheme of transmitting, by a plurality of wireless STAs, successive response frames through a single request frame is as follows: a single request frame including address information regarding multiple users is transmitted through channel access, and the wireless STAs then successively transmit response frames after SIFS.

Downlink operation in a wireless communication system based on MU-MIMO largely includes five phases, specifically a sounding phase for beamforming used in MU-MIMO, a group control phase capable of controlling transmission and reception with regard to multiple users, a NAV distribution phase for protecting MU-MIMO data from legacy wireless STAs, a beamformed data transmission phase for transmitting MU-MIMO data to multiple users within a designated group, and a response phase for receiving an ACK frame from a wireless STA that has received data.

FIG. 1 schematically illustrates downlink operation including a NAV distribution phase for informing of channel use for protecting MU-MIMO data from legacy wireless STAs.

The frame that delivers a NAV value should be decodable by legacy wireless STAs as well. For NAV distribution, when performing channel access to acquire a TXOP, wireless STAs use RTS and CTS frames or short data and ACK frame exchange, or use CTS-to-Self frames.

Similarly, it is also possible to use RTS and CTS frame exchange or CTS-to-Self frames so that legacy wireless STAs can receive in a VHT WLAN system as well.

Therefore, there is a need for a method for efficiently protecting MU-MIMO data by exchanging RTS and CTS frames in a VTH WLAN system, standardization of which is currently in progress.

DISCLOSURE

Technical Problem

An embodiment of the present invention is directed to a method for efficiently protecting MU-MIMO data by exchanging RTS and CTS frames, without modifying the existing control frame format, in a wireless communication system using MU-MIMO technology.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with an embodiment of the present invention, a method for protecting data transmitted from a transmitting wireless station to at least one receiving wireless station in a wireless communication system using MU-MIMO technology includes: transmitting a transmission request frame from the transmitting wireless station to each of the at least one receiving wireless station; and receiving a transmission approval frame from each of the at least one receiving wireless station as a response to the transmission request frame, wherein the transmission request frame comprises a VHT data marker for protecting VHT traffic.

The transmission request frame may be a RTS (Request To Send) frame, and the transmission approval frame may be a CTS (Clear To Send) frame. The VHT data marker may use a specific field of the RTS frame for a legacy wireless station.

The RTS frame may have a duration corresponding to the sum of transmission time of the CTS frame, transmission time of a next data frame, and response time for the next data frame.

The RTS frame may have a duration corresponding to a limit value of TXOP.

In accordance with another embodiment of the present invention, a method for protecting data transmitted from a transmitting wireless station to receiving wireless stations as many as a natural number n (n≥1) in a wireless communication system using MU-MIMO technology includes: transmitting a transmission request frame from the transmitting wireless station to each of at least one receiving wireless station; and receiving a transmission approval frame from each of the at least one receiving wireless station as a response to the transmission request frame, wherein the transmission request frame has a frame duration set for NAV setting.

The transmission request frame transmitted to the last receiving wireless station of the plurality of receiving wireless stations may have a duration different from a duration of transmission request frames to the other receiving wireless stations.

The transmission request frames transmitted to the other receiving wireless stations than the last receiving wireless station may have a duration corresponding to the sum of each IFS and transmission time of the transmission approval frames, and the transmission request frame transmitted to the last receiving wireless station may have a duration corresponding to the sum of transmission time of a transmission approval frame by the last receiving wireless station, transmission time of a VHT data frame, transmission time of a response frame, and IFS for each frame.

In accordance with another embodiment of the present invention, a method for protecting data transmitted from a transmitting wireless station to receiving wireless stations as many as a natural number n (n≥1) in a wireless communication system using MU-MIMO technology includes: transmitting a transmission request frame from the transmitting wireless station to each of a plurality of receiving wireless stations; and receiving a transmission approval frame from each of the plurality of receiving wireless stations as a response to the transmission request frame, wherein the transmission approval frames received from the receiving wireless stations, except for the last receiving wireless station, have a duration set as '0', and the transmission request frame transmitted to the last receiving wireless station has a duration corresponding to the sum of transmission time of a transmission approval frame by the last receiving wireless station, transmission time of a VHT data frame, transmission time of a response frame, and IFS for each frame.

The method may further include: resetting a NAV value by the wireless stations, from which the transmission approval frames having a duration of '0' have been received.

Advantageous Effects

According to the present invention, MU-MIMO data is protected by exchanging RTS and CTS frames, without modifying the existing control frame format, in a wireless communication system using MU-MIMO technology so that data can be simultaneously transmitted/received between an AP and a plurality of wireless STAs, while maintaining backward compatibility with existing WLAN systems, and throughput of the WLAN system is improved.

BEST MODE FOR THE INVENTION

Figure 1:
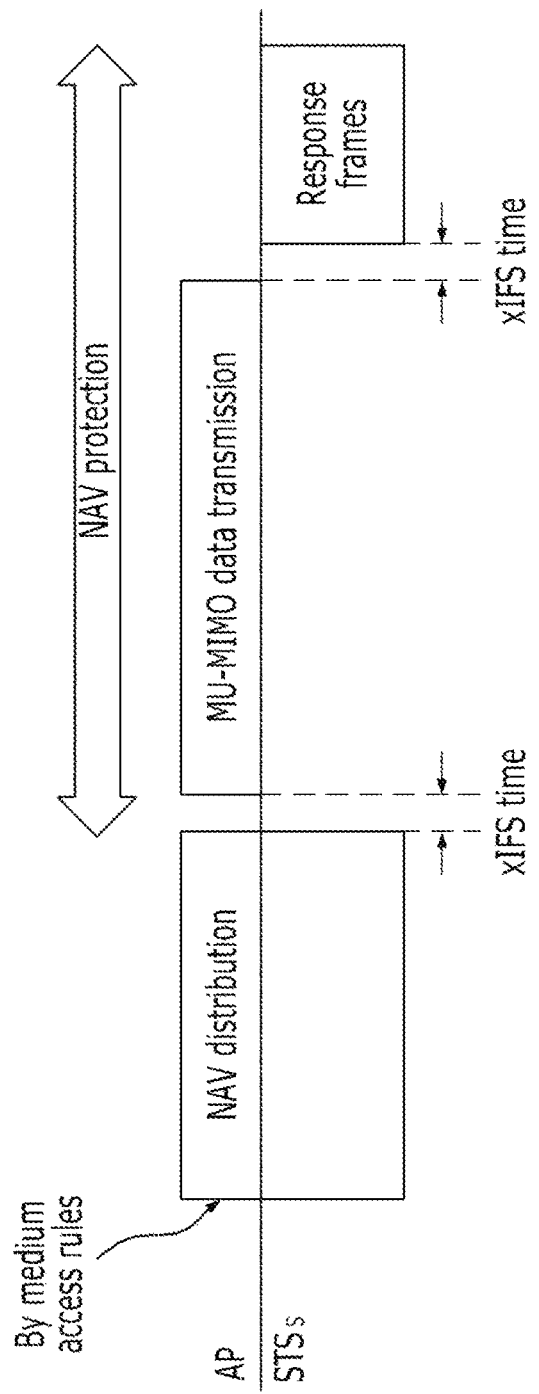
FIG. 1 illustrates downlink operation in a WLAN system to which the present invention is applied.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention will hereinafter be described with reference to a wireless communication system, among various types of high-speed wireless communication systems, to which MU-MIMO technology is applied based on a wireless communication system defined by IEEE 802.11. However, those skilled in the art can understand that the present invention is applicable to any environment using multiple channels or any wireless communication environment using MU-MIMO technology.

Occurrence of channel collision in a MU-MIMO WLAN system, which can transmit data to multiple users simultaneously, may result in low system efficiency compared with system complexity resulting from MU-MIMO application. This means that, compared with conventional RTS and CTS frame exchange, RTS and CTS frames need to be exchanged in a broader range.

The present invention proposes a method for exchanging multiple RTS and CTS frames so that CTS frames are received from all of multiple users who want to receive data, and the NAV of nearby wireless STAs is set.

Figure 2:
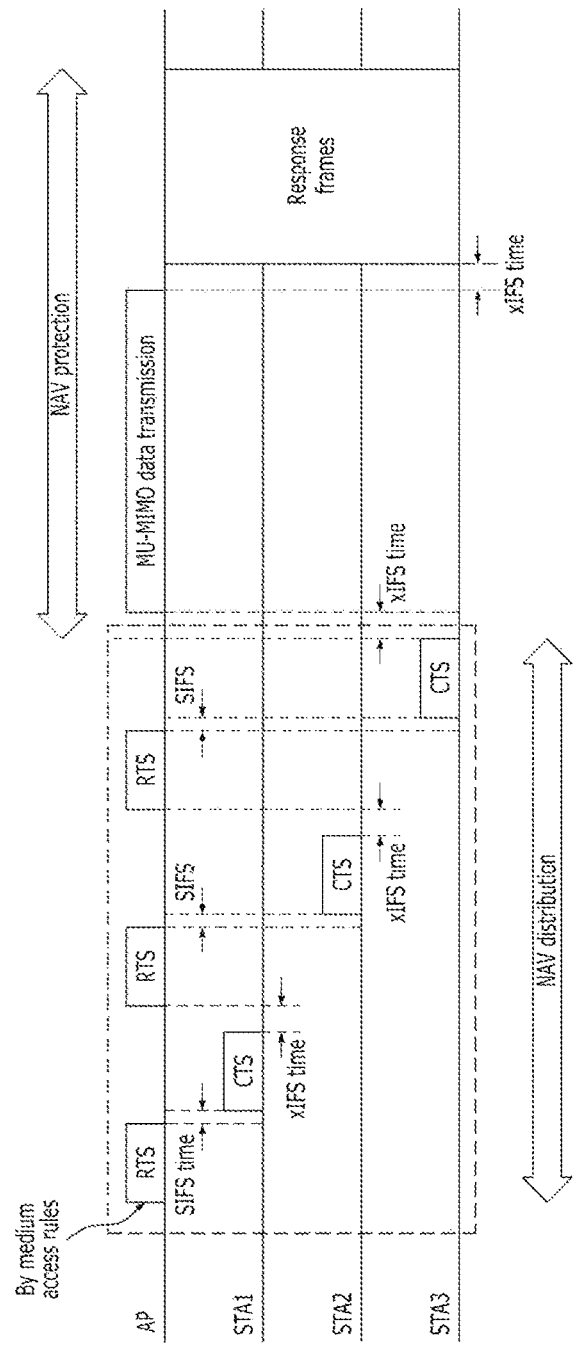
FIG. 2 illustrates a method for protecting MU-MIMO data by exchanging RTS/CTS frames in accordance with an embodiment of the present invention.

FIG. 2 illustrates a method for protecting MU-MIMO data by exchanging RTS/CTS frames in accordance with an embodiment of the present invention. Specifically, FIG. 2 illustrates a RTS/CTS frame multiple exchange process for informing of a NAV value by using a legacy RTS frame format and a legacy CTS frame format. That is, FIG. 2 illustrates RTS/CTS multiple exchanges in a BSS consisting of one AP and three wireless STAs (STA1, STA2, STA3).

Referring to FIG. 2, the AP transmits transmission request messages, i.e. RTS frames, to a plurality of wireless stations STA1, STA2, and STA3, to which data is to be transmitted, and receives transmission approval messages, i.e. CTS messages, from respective wireless stations STA1, STA2, and STA3 in response to the RTS frames. Specifically, the AP transmits a RTS frame to STA1 through channel access. Then, the AP receives a CTS frame from STA1 after SIFS.

Subsequently, the AP similarly exchanges RTS/CTS frames with STA2. The AP also exchanges RTS/CTS frames with STA3. When the transmitting side is changed, a CTS frame is transmitted in response to a RTS frame after SIFS. However, when the AP receives a CTS frame from a wireless STA and then transmits a RTS frame to another wireless STA, the IFS (xIFS) between the RTS and CTS frames may be one of SIFS, RIFS (Reduced Inter-Frame Space), and undefined IFS.

Legacy wireless STAs, i.e. conventional WLAN STAs based on IEEE 802.11a and IEEE 802.11n, can receive a RTS or CTS frame from a VTH wireless STA and, upon receiving such a RTS or CTS frame from a VHT STA, can set a NAV value. Therefore, when a legacy wireless STA receives a RTS or CTS frame, it recognizes that the channel is being used and performs no channel access process.

However, if VHT wireless STAs operate the same as legacy STAs in the process of exchanging RTS or CTS frames, the VHT STAs recognize that the channel is being used and do not perform the NAV distribution process of FIG. 2.

Therefore, the present invention proposes that, when a conventional RTS frame is used by VHT wireless STAs to exchange RTS/CTS frames and set NAV for MU-MIMO data protection, the transmitted RTS frame include a mark for protecting VHT traffic (hereinafter, referred to as a VHT data marker). The VHT data marker may be implemented by re-using a specific field of a legacy RTS frame or by using a reserved bit (which is not yet defined) of a legacy RTS frame.

For example, a bit for indicating an individual or a group in the TA field of a legacy RTS frame may be used (when set as '1', indicates a RTS frame for VHT wireless STAs). Upon receiving such a RTS frame, a legacy wireless STA can function normally because it has the same format as a legacy RTS frame. Furthermore, a VHT wireless STA can read a specific field of the RTS frame which has been modified and, when a VHT data marker has been set therein, recognize that it is a RTS frame for VHT traffic protection.

A VHT wireless STA must update the NAV value even if a legacy RTS frame including no VHT data marker is received. Furthermore, even if the VHT wireless STA has received not data, but a RTS frame transmitted by the AP for the next user, the STA must be able to transmit a CTS frame in response to the received RTS frame as long as the receiving STA address is directed to itself.

In such a case, the duration of a RTS frame generally includes 'CTS frame transmission time+next data frame transmission time+response time', or includes all cases including a TXOP limit value.

Those skilled in the art can understand that, although it has been assumed in the description with reference to FIG. 2 that the AP transmits RTS frames to a plurality of wireless STAs, this embodiment of the present invention is also applicable when the AP transmits a RTS frame to a single wireless STA.

Figure 3:
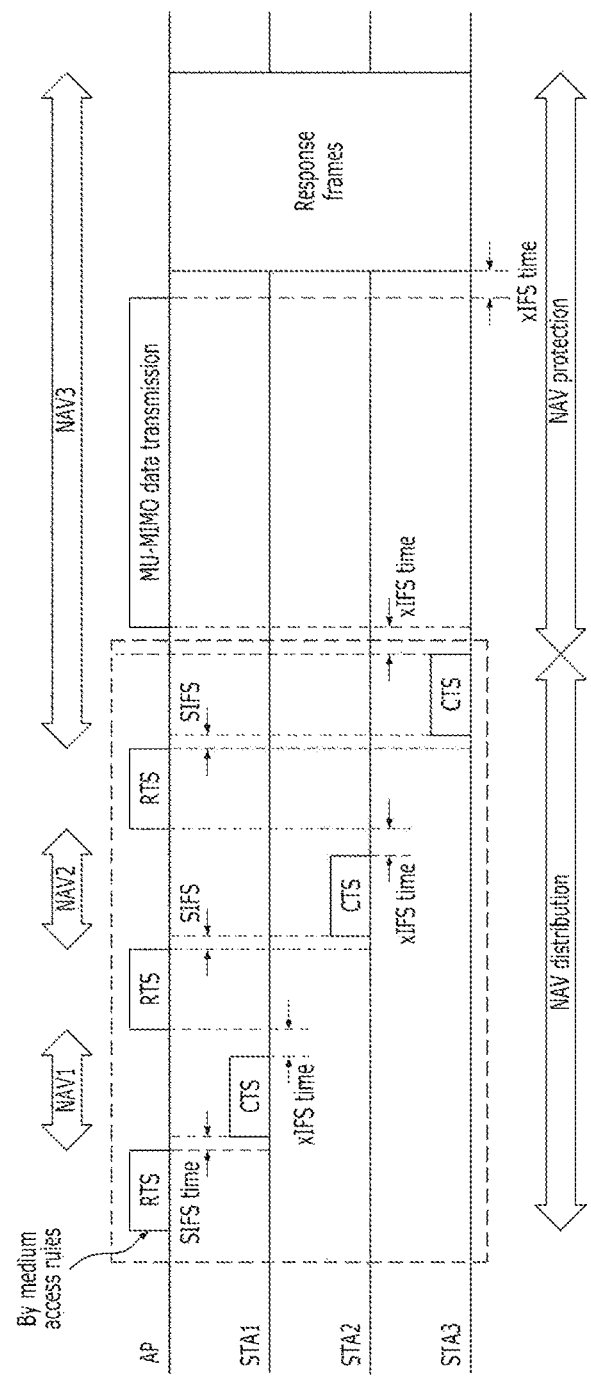
FIG. 3 illustrates a method for protecting MU-MIMO data by setting the interval of a CTS frame by an AP in accordance with another embodiment of the present invention.

FIG. 3 illustrates a method for protecting MU-MIMO data by setting the duration of a CTS frame by an AP in accordance with another embodiment of the present invention.

The method in accordance with another embodiment of the present invention illustrated in FIG. 3 proposes that the AP sets a short duration of RTS frames transmitted to multiple users so that, even if VHT wireless STAs do not modify the process of receiving and processing RTS or CTS frames, VHT data protection operation is performed.

Referring to FIG. 3, the AP transmits transmission request frames, i.e. RTS frames, to a plurality of wireless STAs (STA1, STA2, STA3), to which data is to be transmitted, and receives transmission approval frames, i.e. CTS frames, from respective wireless STAs (STA1, STA2, STA3) in response to the RTS frames. In this case, the AP sets the duration of RTS frames transmitted to respective wireless STAs.

In other words, when the AP is to transmit data to multiple user STAs as many as n, the duration of RTS frames to the first to $(n-1)^{th}$ VHT wireless STAs is set as "SIFS+CTS transmission time" as in the case of NAV1 and NAV2 illustrated in FIG. 3. The duration of a RTS frame to the $n^{th}$ VHT wireless STA is set as "SIFS+CTS transmission time+xIFS+MU-MIMO data frame transmission time+xIFS+response frame transmission time", as in the case of NAV3 illustrated in FIG. 3, for VHT data protection.

That is, when the AP is to transmit data to multiple wireless STAs as many as n, the duration of RTS frames to the first to $(n-1)^{th}$ wireless STAs is set as a period of time for receiving CTS frames from respective wireless STAs, and the duration of a RTS frame to the $n^{th}$ wireless STA is set as a period of time for receiving a CTS frame from the $n^{th}$ wireless STA, transmitting MU-MIMO data to n wireless STAs, and receiving response frames to the transmitted MU-MIMO data.

As such, this embodiment of the present invention can use both legacy RTS frames and CTS frames and control the duration of RTS frames by the VHT AP, making it unnecessary to modify the CTS frame processing operation. Those skilled in the art can understand that, although it has been assumed in the description of this embodiment that the AP transmits RTS frames to n wireless STAs, the AP may also transmit a RTS frame only to one of the plurality of wireless STAs and, even in this case, the AP can set the duration of the RTS frame and control NAV for data protection.

Figure 4:
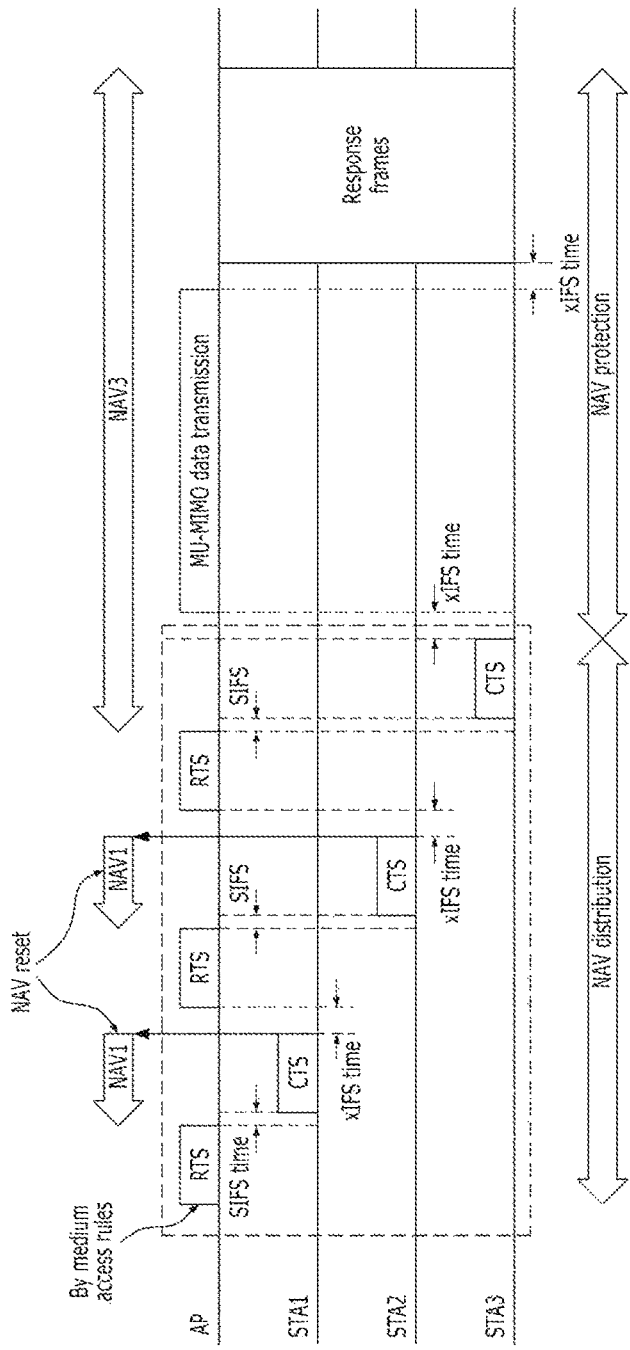
FIG. 4 illustrates a method for protecting MU-MIMO data by changing the duration of a CTS frame by a wireless STA in accordance with still another embodiment of the present invention.

FIG. 4 illustrates a method for protecting MU-MIMO data by modifying the duration of a CTS frame by a wireless STA in accordance with still another embodiment of the present invention.

According to the method in accordance with still another embodiment of the present invention, the duration of a RTS frame is set to be larger than the NAV distribution period, but a wireless STA, after receiving the RTS frame, sets the duration of a CTS frame as '0', regardless of the duration of the received RTS frame, and then makes a response.

After transmitting such CTS frames with '0' duration, multiple wireless STAs perform NAV reset. In this case, in accordance with the present invention, the $n^{th}$ wireless STA does not set the duration of a transmitted CTS frame as '0' for the sake of MU-MIMO data protection. That is, the AP can set the duration of a RTS frame to the $n^{th}$ wireless STA as "SIFS+CTS transmission time+xIFS+MU-MIMO data frame transmission time+xIFS+response frame transmission time", and the $n^{th}$ wireless STA can designate a data protection interval by avoiding setting the duration of a CTS frame as '0'.

In other words, referring to FIG. 4, when the AP is to transmit data to multiple wireless STAs (STA1, STA2, STA3) as many as n, STA1 and STA2 set the duration of CTS frames as '0' regardless of the duration of the received RTS frames and then transmit CTS frames. Consequently, wireless STAs that have received the CTS frames with '0' duration reset the NAV value. The AP sets the duration of a RTS frame to the $n^{th}$ wireless STA (i.e. STA3) as the period of time needed by the $n^{th}$ wireless STA to transmit a CTS frame, to transmit MU-MIMO data to the n wireless STAs, and to receive response frames to the transmitted MU-MIMO data, i.e. "SIFS+CTS transmission time+xIFS+MU-MIMO data frame transmission time+xIFS+response frame transmission time". As a result, the $n^{th}$ wireless STA (i.e. STA3) does not set the duration of a CTS frame as '0', but retains the duration of the RTS frame. Such a process of transmitting beamformed data by NAV3 supports NAV protection.

As such, in accordance with still another embodiment of the present invention, legacy RTS and CTS frame formats can be used without adding or modifying the RTS/CTS frame format and, even if a CTS frame fails to be transmitted, a different wireless STA maintains NAV protection, enabling recovery by the AP. The present invention also makes it unnecessary for a VHT wireless STA to transmit a CTS frame and update the NAV.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The present invention is applicable to technology for protecting MU-MIMO data by exchanging multiple RTS/CTS frames in a wireless communication system based on MU-MIMO.

What is claimed is:

1. A method for protecting data transmitted from a transmitting wireless station to at least one receiving wireless station in a wireless communication system using Multi-User Multiple Input Multiple Output (MU-MIMO) technology, comprising:
   (a) transmitting a transmission request frame from the transmitting wireless station to each of the at least one receiving wireless station; and
   (b) receiving a transmission approval frame from each of the at least one receiving wireless station as a response to the transmission request frame, wherein
   the transmission request frame is a Request To Send (RTS) frame having a same format as an IEEE 802.11a RTS frame or an IEEE 802.11n RTS frame, and includes a Very High Throughput (VHT) data marker for protecting VHT traffic,
   the transmission approval frame is a Clear to Send (CTS) frame,
   the VHT data marker includes a bit that is a reserved bit in an IEEE 802.11a RTS frame or an IEEE 802.11n RTS frame, and
   the RTS frame includes a duration value corresponding to a sum of a transmission time of the CTS frame, a transmission time of a next data frame, and a response time for the next data frame.

2. The method of claim 1, wherein the duration value corresponds to a Transmission Opportunity (TXOP) limit value.

3. A method for protecting data transmitted from a transmitting wireless station to a plurality of receiving wireless stations in a wireless communication system using Multi-User Multiple Input Multiple Output (MU-MIMO) technology, comprising:
   (a) transmitting a first transmission request frame from the transmitting wireless station to each of at least one first receiving wireless stations, the first transmission request frame including a value corresponding to a first duration;
   (b) receiving a transmission approval frame from each of the at least one first receiving wireless stations as a response to the first transmission request frame;
   (c) transmitting a second transmission request frame from the transmitting wireless station to a second receiving wireless station, the second transmission request frame including a value corresponding to a second duration; and
   (d) receiving a transmission approval frame from the second receiving wireless station as a response to the second transmission request frame, wherein
   the first duration includes a sum of an interframe space duration and a transmission time of the first transmission approval frame, and
   the second duration includes a sum of a first interframe space duration, a transmission time of the second transmission approval frame, a transmission time of a MU-MIMO data frame, a transmission time of a response frame, and a second interframe space duration.

4. The method of claim 3, wherein the second transmission request frame is a last transmission request frame transmitted before a MU-MIMO data transmission.

5. The method of claim 3, wherein the first and second transmission request frames are Ready To Send (RTS) frames, and the first and second transmission approval frames are Clear To Send (CTS) frames.

6. A method for protecting data transmitted from a transmitting wireless station to a plurality of receiving wireless stations in a wireless communication system using Multi-User Multiple Input Multiple Output (MU-MIMO) technology, comprising:
(a) transmitting a first transmission request frame from the transmitting wireless station to a first receiving wireless station;
(b) receiving a first transmission approval frame from the first receiving wireless station as a response to the first transmission request frame;
(c) transmitting a second transmission request frame from the transmitting wireless station to a second receiving wireless station; and
(d) receiving a second transmission approval frame from the second receiving wireless station as a response to the second transmission request frame, wherein the first transmission approval frame includes a value corresponding to a duration set as '0', the first transmission request frame includes a value corresponding to a duration greater than a Network Allocation Vector (NAV) distribution period, and the second transmission request frame includes a value corresponding to a duration corresponding to a sum of a transmission time of a transmission approval frame, a transmission time of a MU-MIMO data frame, a transmission time of a response frame, and a duration of a plurality of InterFrame Spaces (IFSs).

7. The method of claim 6, wherein at least one of the first and second wireless receiving stations resets a Network Allocation Vector (NAV) value when the at least one wireless receiving station receives the first transmission approval frame.

8. The method of claim 7, wherein the transmission request frame is a Ready To Send (RTS) frame, and the transmission approval frame is a Clear To Send (CTS) frame.

9. The method of claim 6, further comprising:
transmitting a third transmission request frame from the transmitting wireless station to a third receiving wireless station; and
receiving a third_transmission approval frame from the third receiving wireless station as a response to the third_transmission request frame, wherein
the third_transmission approval frame includes a value corresponding to a duration set as '0'.

10. The method of claim 6, wherein the second transmission request frame is the last transmission request frame transmitted before an MU-MIMO data transmission.

11. The method of claim 1, wherein the VHT data marker includes a bit of a Transmitter Address (TA) field.

* * * * *